Feb. 3, 1931.   A. RASMUSSEN   1,791,001
STEERING WHEEL POST
Filed Jan. 30, 1929
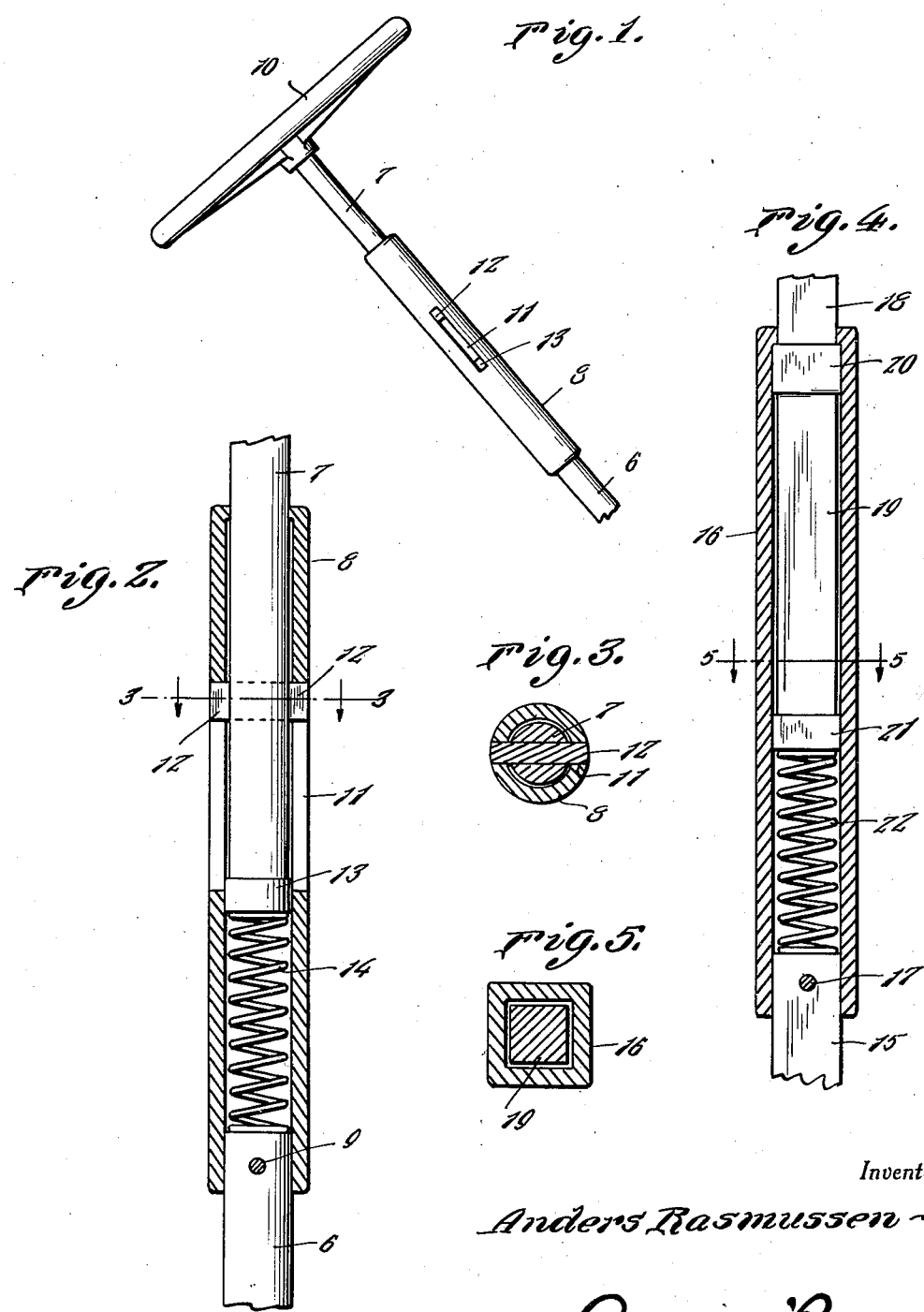
Inventor
Anders Rasmussen
By Clarence A. O'Brien
Attorney Patented Feb. 3, 1931

1,791,001

UNITED STATES PATENT OFFICE

ANDERS RASMUSSEN, OF NEW ALBANY, INDIANA

STEERING-WHEEL POST

Application filed January 30, 1929. Serial No. 336,159.

This invention relates to an improved post construction for steering wheels, such as are embodied in the steering gear structure of automobiles and similar motor vehicles.

The purpose of the invention is to provide a post which includes therein novel shock absorbing means normally ineffective, and capable of being brought into play in case of accident, whereby to relieve the operator of injury by being forcibly thrown against the steering wheel.

In the ordinary steering post and wheel structure, the arrangement is such as to provide a rigid assembly and in case of an accident, the operator is frequently subjected to severe injury, by being jammed or thrust against the steering wheel. With the improved arrangement embodied in this application, in case of accident, the steering wheel and a portion of the post on which it is mounted will collapse in a manner to relieve the operator of the otherwise injurious impact.

The particular structural organization constituting the novelty will become more readily apparent from the following description and drawings.

In the drawings:

Figure 1 is a side elevational view of a steering post constructed in accordance with the present invention.

Figure 2 is an enlarged longitudinal sectional view therethrough, showing one embodiment of the invention.

Figure 3 is a horizontal cross section on the line 3—3 of Figure 2.

Figure 4 is a view similar to Figure 2 showing a different embodiment of the invention.

Figure 5 is a cross sectional view on the plane of the line 5—5 of Figure 4.

Referring in detail to Figures 1 to 3 inclusive, it will be observed that the reference character 6 designates the relatively stationary section of the steering post, 7 the relatively movable portion, and 8 a coupling sleeve between these sections. This sleeve is rigidly pinned or fastened as at 9 to the rigid section 6. The hand wheel 10 is fixedly mounted on the upper end of the relatively movable section 7. The section 7 fits slidably and telescopically into the coupling sleeve 8. In this sleeve is formed diametrically opposite slots 11 functioning as longitudinal key ways and adapted to receive the projecting key 12 on diametrically opposite sides of the slidable post section 7. This post section 7 includes a head 13, engaging one end of the shock absorbing element 14, here shown in the form of a coil spring.

The opposite end of this spring bears against the section 6 of the post.

In Figures 4 and 5, the construction is slightly different. Here the reference character 15 designates a rectangular relatively fixed section of the steering post, through which the coupling sleeve or tube 16 is pinned as at 17. The tube in this instance is imperforate not being provided with slots. The relatively slidable section 18 of the steering post includes a rectangular portion 19, fitting within the tube and provided with enlarged heads 20 and 21 respectively, having snug sliding contact with the interior of the tube. The head 21 bears against the shock absorbing coil spring 22, which is arranged in the coupling and which rests against the upper end of the section 15. The principle of operation in both inventions is the same, that is, in case the operator is thrown down on the steering wheel 10, the slidable section will telescope into the coupling against the tension of the spring, thereby absorbing shock. Hence it will be seen that although the steering post is made in sections, it will function normally for reliable steering, but in case of accident will yield, to relieve the operator of severe injury.

A careful consideration of the description in conjunction with the drawings will enable the readers to obtain a clear understanding of the invention. Therefore a more lengthly description is regarded as unnecessary.

Minor changes in the shape, size and rearrangement of details coming within the field of invention claimed may be resorted to, in actual practice, if desired.

I claim:

In a structure of the class described, a divided shaft, a coupling sleeve rigidly secured to the lowermost end of said shaft, said coupling sleeve having elongated diametrically disposed openings intermediate its ends, one end of said sleeve having an inwardly turned integral flange forming a bearing for the upper shaft section, said upper shaft section of less diameter than aforementioned sleeve having an integral head thereon fitting snugly in said sleeve and forming a second bearing between upper shaft section and said sleeve, and a compressible spring interposed between the two shaft sections and confined within said sleeve.

In testimony whereof I affix my signature.

ANDERS RASMUSSEN.